(12) United States Patent
Fujisawa et al.

(10) Patent No.: US 12,400,544 B2
(45) Date of Patent: Aug. 26, 2025

(54) PARKING LOT MANAGEMENT METHOD, STORAGE MEDIUM, AND COMPUTER DEVICE

(71) Applicant: TOYOTA JIDOSHA KABUSHIKI KAISHA, Toyota (JP)

(72) Inventors: Hisashi Fujisawa, Toyota (JP); Shigeki Kinomura, Toyota (JP); Atsushi Oki, Nagoya (JP); Hiroki Takabatake, Chiryu (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 201 days.

(21) Appl. No.: 18/352,411

(22) Filed: Jul. 14, 2023

(65) Prior Publication Data
US 2024/0029564 A1   Jan. 25, 2024

(30) Foreign Application Priority Data
Jul. 21, 2022   (JP) .................................. 2022-116346

(51) Int. Cl.
  *G08G 1/14*   (2006.01)
  *B60L 53/63*  (2019.01)
  (Continued)

(52) U.S. Cl.
  CPC .............. *G08G 1/148* (2013.01); *B60L 53/63* (2019.02); *B60L 53/68* (2019.02); *G08G 1/143* (2013.01);
  (Continued)

(58) Field of Classification Search
  CPC ........ G08G 1/148; G08G 1/143; G08G 1/144; G08G 1/146; G08G 1/149; B60L 53/63; B60L 53/68; B60L 53/67
  See application file for complete search history.

(56) References Cited

U.S. PATENT DOCUMENTS

2011/0127944 A1*  6/2011  Saito .................. B60L 53/11
                                                    320/109
2011/0131083 A1*  6/2011  Redmann ............ G07F 17/24
                                                    705/13
(Continued)

FOREIGN PATENT DOCUMENTS

JP  H 04-080899 A     3/1992
JP  2009037553 A  *  2/2009  ............. G08G 1/14
(Continued)

OTHER PUBLICATIONS

Translation of JP-2009037553-A, 8 pages (Year: 2009).*
Translation of JP-2020067969-A, 13 pages (Year: 2020).*

*Primary Examiner* — Dale W Hilgendorf
(74) *Attorney, Agent, or Firm* — Finnegan, Henderson, Farabow, Garrett and Dunner, LLP

(57) ABSTRACT

A parking lot management method for managing a parking lot includes determining whether a parking space in the parking lot is insufficient. Further, the parking lot management method further includes at least one of executing a process of prompting at least one vehicle parked in the parking lot to exit when it is determined that a parking space in the parking lot is insufficient, and requesting at least one vehicle electrically connected to a power supply facility to execute energy management when it is determined that the parking space in the parking lot is not insufficient and a predetermined condition is satisfied.

10 Claims, 4 Drawing Sheets

(51) Int. Cl.
*B60L 53/67* (2019.01)
*B60L 53/68* (2019.01)

(52) U.S. Cl.
CPC ............ *G08G 1/144* (2013.01); *G08G 1/146* (2013.01); *G08G 1/149* (2013.01); *B60L 53/67* (2019.02)

(56) References Cited

U.S. PATENT DOCUMENTS

| | | | | |
|---|---|---|---|---|
| 2013/0179383 | A1* | 7/2013 | Pringle | G06N 7/01 320/109 |
| 2014/0089016 | A1* | 3/2014 | Smullin | G06Q 10/02 705/5 |
| 2016/0071172 | A1* | 3/2016 | Shangguan | H04W 4/02 705/13 |
| 2018/0054490 | A1* | 2/2018 | Wadhwa | G08G 1/0141 |
| 2019/0275898 | A1* | 9/2019 | Haneda | G08G 1/146 |
| 2020/0311622 | A1* | 10/2020 | Noguchi | G06Q 10/06315 |
| 2021/0300339 | A1* | 9/2021 | Shimamoto | B60W 60/0059 |
| 2022/0176841 | A1* | 6/2022 | Moura | B60L 53/665 |
| 2022/0194257 | A1* | 6/2022 | Hamada | B60L 53/67 |
| 2022/0414798 | A1* | 12/2022 | Penfold | B60L 53/66 |

FOREIGN PATENT DOCUMENTS

| | | | |
|---|---|---|---|
| JP | 2012-139008 A | 7/2012 | |
| JP | 2012-215923 A | 11/2012 | |
| JP | 2013-127756 A | 6/2013 | |
| JP | 2020067968 A * | 4/2020 | ............ G06Q 50/10 |
| JP | 2022-098769 A | 7/2022 | |

\* cited by examiner

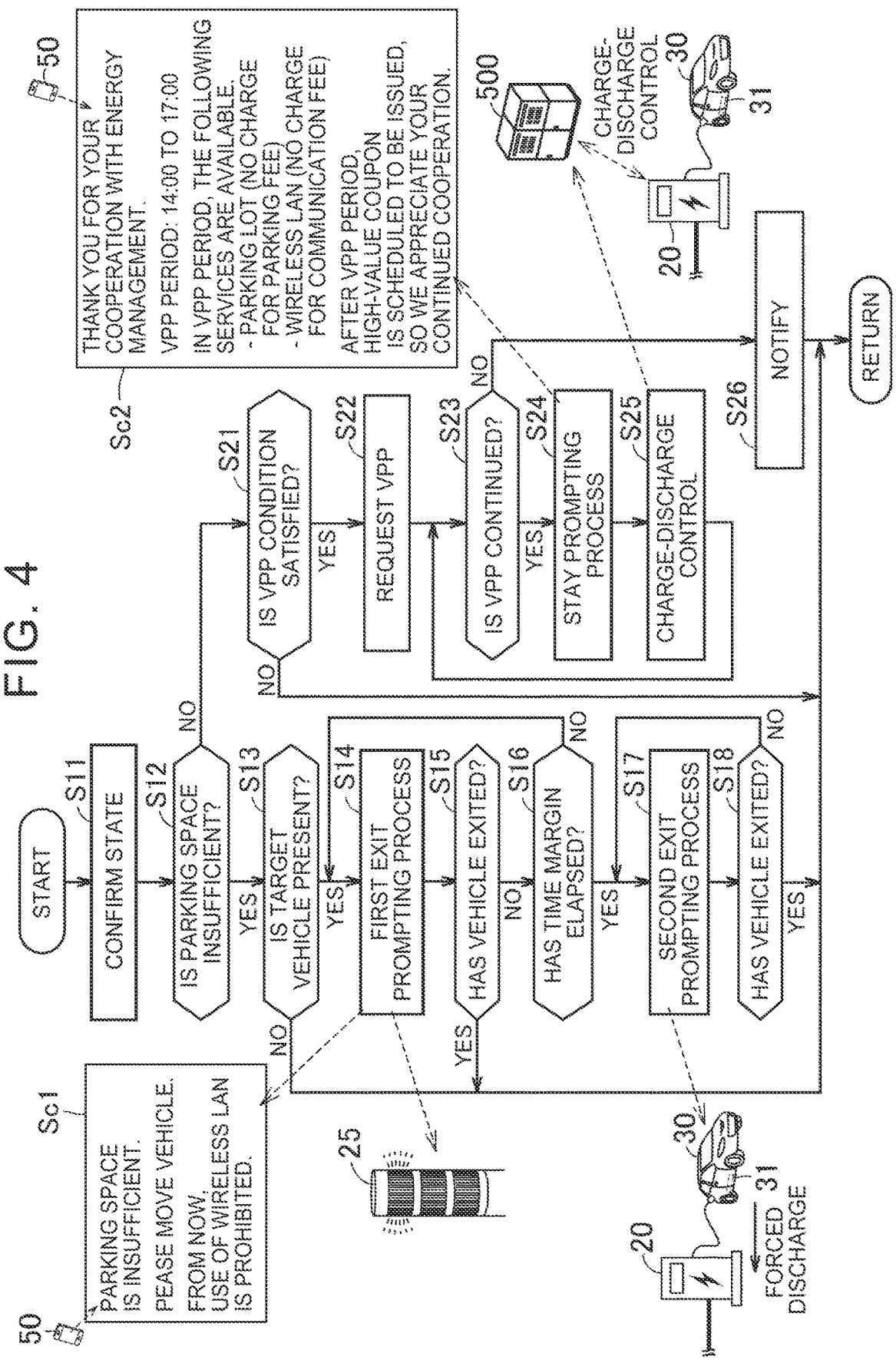

PARKING LOT MANAGEMENT METHOD, STORAGE MEDIUM, AND COMPUTER DEVICE

CROSS-REFERENCE TO RELATED APPLICATION

This application claims priority to Japanese Patent Application No. 2022-116346 filed on Jul. 21, 2022 incorporated herein by reference in its entirety.

BACKGROUND

1. Technical Field

The present disclosure relates to a parking lot management method, a storage medium, and a computer device.

2. Description of Related Art

Conventionally, a technique for charging a power storage device mounted on a parked vehicle using a power supply facility installed in a parking lot is known. For example, Japanese Unexamined Patent Application Publication No. 2012-139008 (JP 2012-139008 A) discloses a battery electric vehicle charging device that causes a display device to display charging time as charging completion prediction information.

SUMMARY

In recent years, with the spread of an electrified vehicle (for example, a battery electric vehicle), the number of facilities (stores, etc.) in which electric vehicle service equipment (EVSE) is installed in a parking lot within the premises has been increasing. Further, in the parking lot of the facility, there is a problem that the vehicle continues to stay in the parking lot even after charging of a power storage device mounted on the vehicle is completed.

In general, parking a vehicle for a long time in a parking lot of a store is considered to be a disadvantage for a store owner because it results in an insufficient parking space and a lower turnover rate of customers. Therefore, when a store clerk finds such a vehicle, the store clerk may put a sticker on the vehicle and ask the vehicle to exit. However, there is a possibility that utilizing the vehicle parked in the parking lot of the store for management of the store will be advantageous for both the store owner and a vehicle user. For example, the parked vehicle may be used for energy management.

Conventionally, there is no concept of utilizing the vehicle parked in the parking lot of the facility, and the vehicle parked in the parking lot of the facility for a long time is uniformly asked to exit.

The present disclosure has been made to solve the above issue, and an object of the present disclosure is to promote utilization of the vehicle parked in the parking lot while suppressing the shortage of the parking space in the parking lot.

With a mode according to a first aspect of the present disclosure, a parking lot management method described below is provided.

(First aspect) The parking lot management method is a method for managing a parking lot, and includes: determining whether a parking space in the parking lot is insufficient; and executing a process of prompting at least one vehicle parked in the parking lot to exit when determination is made that the parking space in the parking lot is insufficient.

According to the above method, when determination is made that the parking space in the parking lot is insufficient, the process of prompting the parked vehicle to exit is executed. As a result, the shortage of the parking space in the parking lot is suppressed. On the other hand, when the parking space in the parking lot is not insufficient, the process of prompting the parked vehicle to exit is not executed, so that the utilization of the parked vehicle can be promoted.

The parking lot management method according to the first aspect can have a configuration described in any one of second to seventh aspects indicated below.

(Second aspect) The parking lot management method according to the first aspect further includes the following features. In the parking lot, a power supply facility configured to be able to charge a power storage device mounted on a vehicle is installed. The parking lot management method further includes requesting at least one vehicle electrically connected to the power supply facility in the parking lot to execute energy management when determination is made that the parking space in the parking lot is not insufficient.

According to the above embodiment, when determination is made that the parking space in the parking lot is not insufficient, the process of requesting the parked vehicle to execute the energy management is executed. This makes it easier to use the vehicle parked in the parking lot for the energy management while suppressing the shortage of the parking space in the parking lot.

The vehicle may be an electrified vehicle (xEV) that uses power as a power source in whole or in part. The xEV includes a battery electric vehicle (BEV), a plug-in hybrid electric vehicle (PHEV), a fuel cell electric vehicle (FCEV), and the like.

(Third aspect) The parking lot management method according to the second aspect further includes the following features. The parking lot management method further includes: executing a process of prompting the vehicle that has accepted a request of the energy management to stay in the parking lot; and executing charge-discharge control of the power storage device mounted on the vehicle that has accepted the request of the energy management.

According to the above method, the process of prompting the vehicle that has accepted the request of the energy management to stay in the parking lot is executed. This makes it easier to secure the number of vehicles required for the energy management. Further, according to the above method, the charge-discharge control of the power storage device mounted on the vehicle is executed for the vehicle that has accepted the request of the energy management. The energy management can be performed by such charge-discharge control.

An example of the process of prompting the vehicle to stay in the parking lot includes the process of improving convenience for a user of the vehicle in the parking lot. For example, the user of the vehicle is permitted to use a communication network provided by the facility to the parking lot, so that it is possible to prompt the vehicle to stay in the parking lot.

(Fourth aspect) The parking lot management method according to any one of the first to the third aspects further includes the following features. Determining whether the parking space is insufficient includes: predicting the future number of users; and determining whether the parking space in the parking lot is insufficient using current availability of the parking lot and the predicted number of users.

According to the above method, it becomes easy to accurately determine whether the parking space in the parking lot is insufficient based on the empty space (occupancy rate) in the parking lot and the number of users, which fluctuate from moment to moment.

(Fifth aspect) The parking lot management method according to any one of the first to the fourth aspects further includes the following features. Executing the process of prompting the vehicle to exit includes issuing a warning by a warning light installed in the parking lot.

As described above, the warning light installed in the parking lot is used, so that it is possible to prompt the vehicle to exit from the parking lot.

(Sixth aspect) The parking lot management method according to any one of the first to the fifth aspects further includes the following features. Executing the process of prompting the vehicle to exit includes prohibiting use of a communication network provided by a facility to the parking lot.

As described above, the user of the vehicle is prohibited to use the communication network provided by the facility to the parking lot, so that it is possible to prompt the vehicle to exit from the parking lot.

(Seventh aspect) The parking lot management method according to any one of the first to the sixth aspects further includes the following features. The parking lot management method further includes: confirming whether the vehicle that has received the process of prompting the vehicle to exit has exited; and changing a content of the process of prompting the vehicle to exit when the vehicle that has received the process of prompting the vehicle to exit does not exit.

According to the above method, when the vehicle that has received the process of prompting the vehicle to exit does not exit, the content of the process of prompting the vehicle to exit is changed, so that it is possible to prompt the vehicle to exit with a more effective process.

With a mode according to the second aspect of the present disclosure, a parking lot management method described below is provided.

(Eighth aspect) The parking lot management method is a method for managing a parking lot. In the parking lot, a power supply facility configured to be able to charge a power storage device mounted on a vehicle is installed. The parking lot management method includes determining whether a parking space in the parking lot is insufficient, and requesting at least one vehicle electrically connected to the power supply facility to execute energy management to when determination is made that the parking space in the parking lot is not insufficient and a predetermined condition is satisfied.

According to the above parking lot management method, when determination is made that the parking space in the parking lot is not insufficient, and the predetermined condition is satisfied, the process of requesting the parked vehicle to execute the energy management is executed. This makes it easier to use the vehicle parked in the parking lot for the energy management while suppressing the shortage of the parking space in the parking lot.

With a mode according to another aspect, a storage medium storing a program that causes a computer to execute the parking lot management method according to any one of the first to eighth aspects is provided. In one mode, a computer device including a storage device for storing the program and a processor for executing the program stored in the storage device is provided. In another mode, a computer device for distributing the program is provided.

According to the present disclosure, it is possible to promote the utilization of the vehicle parked in the parking lot while suppressing the shortage of the parking space in the parking lot.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart showing a parking lot management method according to the embodiment of the present disclosure.

DETAILED DESCRIPTION OF EMBODIMENTS

Figure 1:
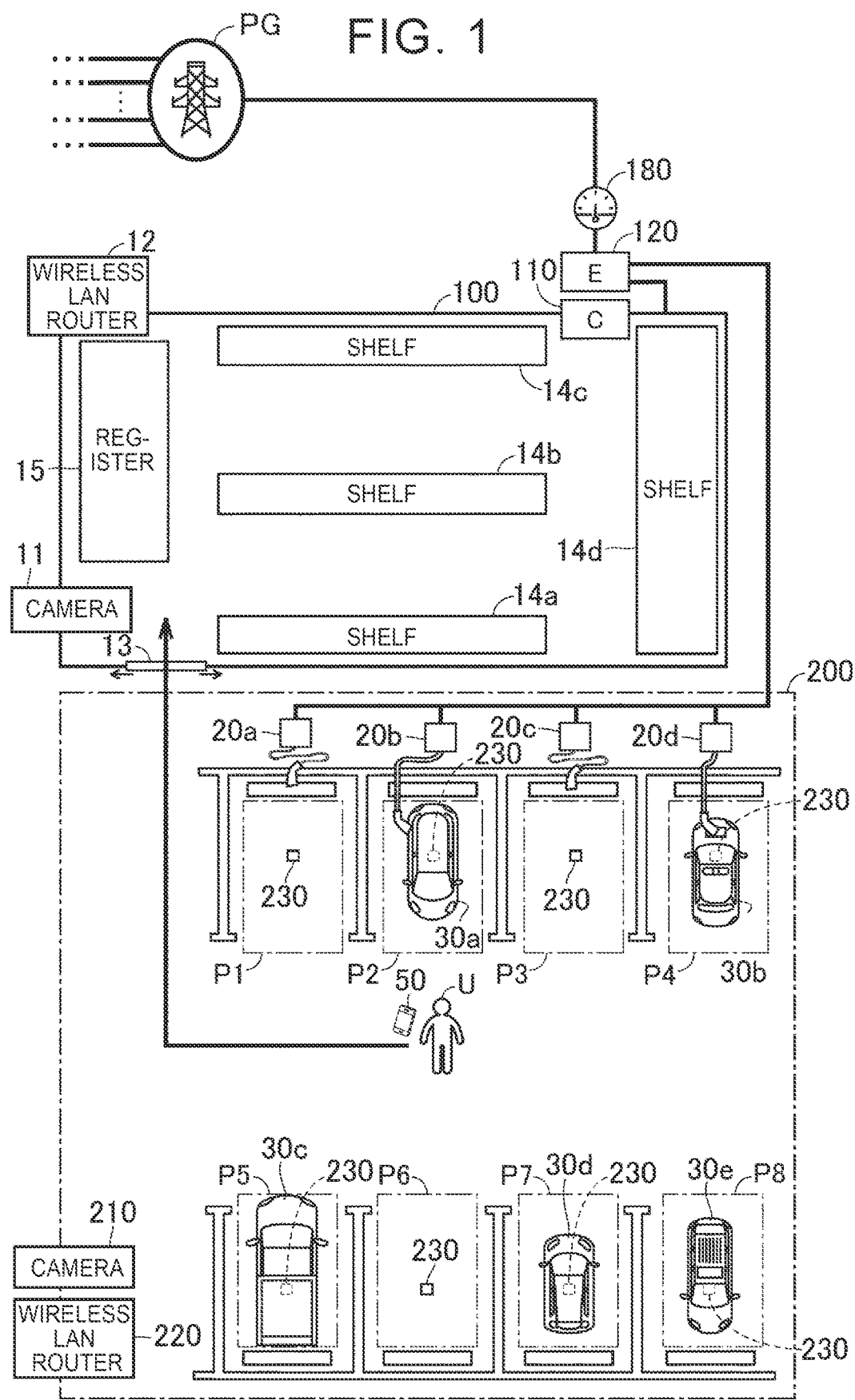
FIG. 1 is a diagram illustrating an outline of a parking lot management system according to an embodiment of the present disclosure.

An embodiment of the present disclosure will be described in detail with reference to the drawings. In the drawings, the same or corresponding parts are denoted by the same reference signs and the description thereof will not be repeated.

FIG. 1 is a diagram illustrating an outline of a parking lot management system according to the embodiment of the present disclosure. Referring to FIG. 1, the parking lot management system according to the present embodiment manages a parking lot 200 of a store 100. In the present embodiment, the store 100 is a convenience store (hereinafter also simply referred to as a "convenience store"). However, the business type of the store 100 is not limited to this, and is decided as appropriate. The store 100 may be, for example, a department store, a supermarket, or a shopping mall store.

A user U is a customer of the store 100. A mobile terminal 50 is a terminal carried by the user U. In the present embodiment, a smartphone equipped with a touch panel display is adopted as the mobile terminal 50. The smartphone has a built-in computer. However, the mobile terminal 50 is not limited to this, and any mobile terminal can be adopted as the mobile terminal 50. For example, a laptop, a tablet terminal, a mobile game machine, a wearable device (a smart watch, smart glasses, smart gloves, etc.), an electronic key, etc. can also be adopted as the mobile terminal 50.

Application software for using a service provided by the store 100 (hereinafter referred to as a "convenience store application") is installed in the mobile terminal 50. The identification information (terminal identification (ID)) of the mobile terminal 50 is registered in a control system 110 of the store 100 (more specifically, a server 111 shown in FIG. 2 to be described below) by the convenience store application. The mobile terminal 50 can exchange information with the server 111 through the convenience store application. For example, the server 111 provides coupon information to the mobile terminal 50 through the convenience store application. The server 111 manages information about a plurality of terminals (user information, point information, etc.) by distinguishing the terminals by terminal IDs.

The store 100 includes a camera 11, a wireless LAN router (hereinafter simply referred to as a "router") 12, an automatic door device 13, shelves 14a to 14d, and a cash register (hereinafter simply referred to as a "register") 15. The LAN means a local area network.

The camera 11 functions as a surveillance camera that monitors the inside of the store 100. The camera 11 is always in operation, and sequentially acquires and stores images of the inside of the store 100. The router 12 provides a wireless LAN for the store. For example, the use of the wireless LAN provided by the router 12 is permitted for a terminal on which the convenience store application is installed. The automatic door device 13 includes a door, a sensor for detecting a passing object, and a mechanism for automatically opening and closing the door. The automatic door device 13 automatically opens the door when detecting the approach of the passing object (for example, a person or an object), and closes the door after confirming the passage of the passing object.

Products are displayed on each of the shelves 14a to 14d. Each of the shelves 14a to 14d may include at least one of a price display unit and a mechanism for product replenishment. The price display unit may include a display device that changes display contents according to an instruction from the server 111 shown in FIG. 2 to be described below, and automatically display a product price according to a situation. Each of the shelves 14a to 14d may be a sliding display shelf.

The register 15 mainly calculates fees. For example, the cashless payment at the register 15 using points (virtual currency) accumulated on the convenience store application is permitted for the terminal on which the convenience store application is installed. The register 15 may be a point of sales (POS) register equipped with a point-of-sale information management system. The POS register is configured to collect sales information.

The store 100 receives power supply from a power system PG. The power system PG includes a power grid, a power generation facility, and a substation facility. The power grid is constructed by a power transmission and distribution facility. The power system PG supplies power to a predetermined area. The store 100 is located within the predetermined area. A smart meter 180 is installed at a power receiving point of the store 100. The smart meter 180 measures the electric energy exchanged between the power system PG and the store 100.

Figure 2:
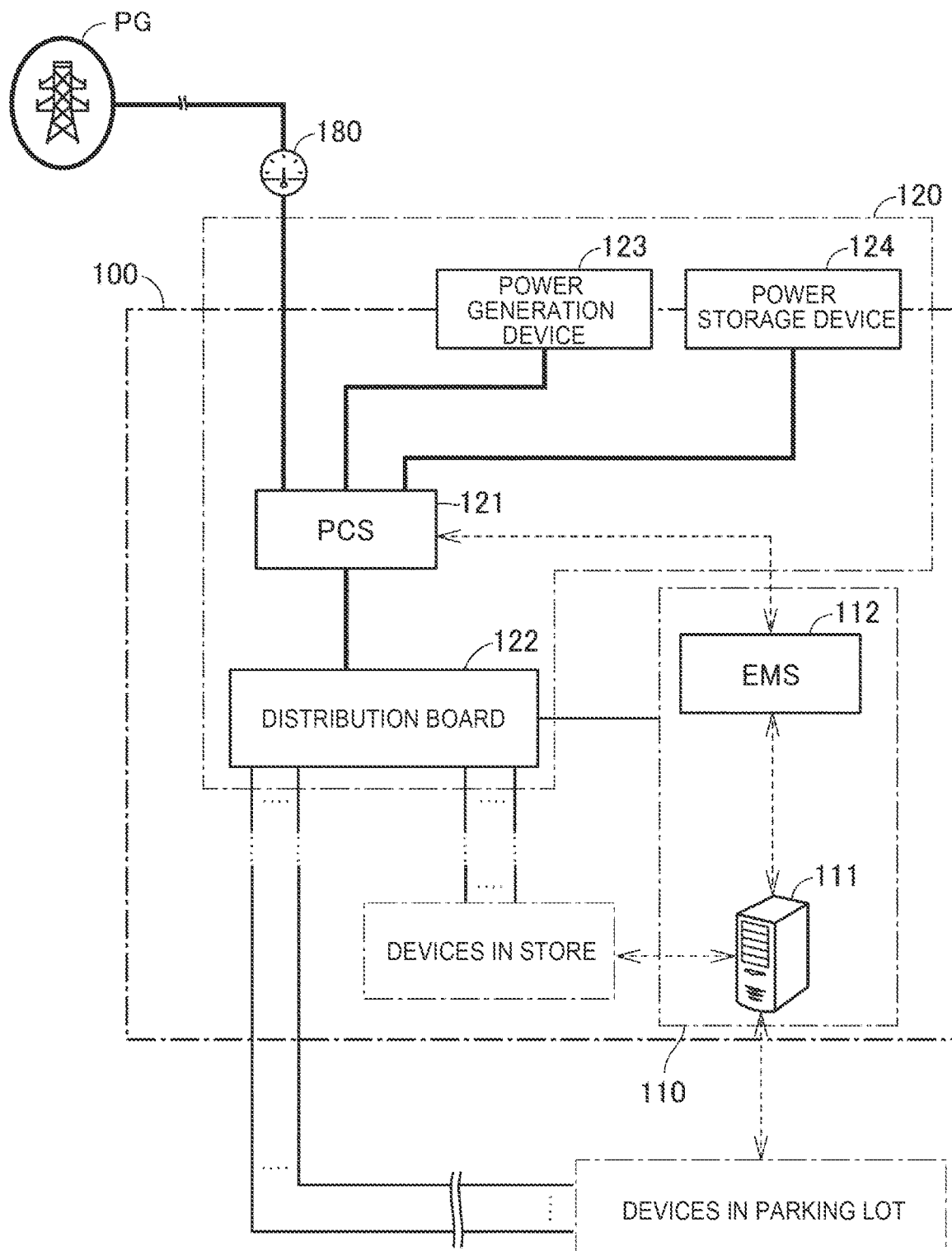
FIG. 2 is a diagram showing a configuration of a control system and a power facility shown in FIG. 1.

The store 100 further includes the control system 110 and a power facility 120. FIG. 2 is a diagram showing a configuration of the control system 110 and the power facility 120.

Referring to FIG. 2 together with FIG. 1, the control system 110 includes the server 111 and an energy management system (EMS) 112. The power facility 120 includes a power conditioning system (PCS) 121, a distribution board 122, a power generation device 123, and a power storage device 124.

The power system PG, the power generation device 123, and the power storage device 124 are each electrically connected to the PCS 121. The power system PG supplies alternating current power to the PCS 121, for example. Each of the power generation device 123 and the power storage device 124 may be installed indoors or outdoors. The power generation device 123 may include at least one of a solar panel installed on the roof of the store 100 and a solar carport installed in the parking lot 200. Further, the power generation device 123 may include a wind power generation device. Further, the power generation device 123 may include a stationary fuel cell (FC) power generator that generates power through a chemical reaction between hydrogen and oxygen. The power storage device 124 may include a stationary energy storage system (ESS). The power storage device 124 may include a lithium-ion battery, a lead-acid battery, a nickel-metal hydride battery, a redox flow battery, or a sodium-sulfur (NAS) battery.

The PCS 121 includes a circuit unit and a control unit that controls the circuit unit. The circuit unit includes various circuits for executing a process related to power conditioning (for example, power conversion and input-output adjustment). The circuit unit may include an alternating current (AC)-direct current (DC) conversion circuit, a transformer circuit (for example, an isolation transformer or a DC-DC converter), and a power factor correction (PFC) circuit. The PCS 121 performs a power conversion process (for example, at least one process of AC-DC conversion, transformation, and frequency conversion) on input power, and supplies power corresponding to the distribution board 122 to the distribution board 122. Further, the PCS 121 performs the power conversion process on the input power, and outputs power suitable for charging the power storage device 124 to the power storage device 124.

The distribution board 122 supplies power to various devices (the camera 11, the router 12, the automatic door device 13, the register 15, etc.) in the store 100 shown in FIG. 1. The control system 110 (the server 111 and the EMS 112) also receives power supplied from the distribution board 122. Further, the distribution board 122 supplies power to various devices (electric vehicle service equipment (EVSE) 20a to 20d, a camera 210, a router 220, a vehicle detection sensor 230, etc.) in the parking lot 200 shown in FIG. 1.

The server 111 is configured to be able to communicate with various devices (the camera 11, the router 12, the automatic door device 13, the register 15, etc.) in the store 100. Further, the server 111 is configured to be able to communicate with various devices (the EVSE 20a to 20d, the camera 210, the router 220, the vehicle detection sensor 230, etc.) in the parking lot 200.

The EMS 112 receives information about the power facility 120 from the PCS 121 and sends a control command to the control unit of the PCS 121. Further, the EMS 112 uses the electric energy detected by the PCS 121 to create an energy management plan. Specifically, the PCS 121 includes a watthour meter that individually detects the power input to the PCS 121 from each of the power system PG, the power generation device 123, and the power storage device 124. The PCS 121 further includes a watthour meter that individually detects the power output from the PCS 121 to each of the distribution board 122 and the power storage device 124. The EMS 112 acquires energy balance information (for example, generated power, demanded power, and stored power) in the store 100 from a detection result of each watthour meter, and records the detection result over time. The EMS 112 creates an energy management plan (for example, a plan for power generation, charging, discharging, and demand limit) based on the acquired energy balance information, information about electricity fees, and a state of charge (SOC) of the power storage device 124. When the store 100 participates in a virtual power plant (VPP) to be described below, the EMS 112 creates the energy management plan in consideration of the energy balance related to the VPP as well. In addition, in a mode in which the power generation device 123 uses natural energy to generate power, the EMS 112 may predict generated power based on weather forecast information, and create the energy management plan in consideration of the generated power that has been predicted. The EMS 112 controls the PCS 121 such that energy management is executed according to the created plan while confirming the detection result of each watthour meter included in the PCS 121. The server 111 and the EMS 112 cooperate to execute the energy management while communicating with each other.

Referring to FIG. 1 again, the parking lot 200 includes the EVSE 20a to 20d, the camera 210, the wireless LAN router (hereinafter simply referred to as the "router") 220, and the vehicle detection sensor 230. The EVSE means the electric vehicle supply equipment.

The camera 210 functions as a surveillance camera that monitors the entire parking lot 200. The camera 210 is always in operation, and sequentially acquires and stores images of the parking lot 200. The server 111 shown in FIG. 2 can acquire the images inside each store 100 and the images of the parking lot 200 from the cameras 11 and 210, respectively. The router 220 provides the wireless LAN for the entire parking lot 200. For example, the use of the wireless LAN provided by the router 220 is permitted for a terminal on which the convenience store application is installed. The server 111 shown in FIG. 2 can control the routers 12 and 220 so as to prohibit the use of the wireless LAN only for a specific terminal designated by the terminal ID.

The parking lot 200 includes parking slots P1 to P8. The parking slots P1, P2, P3, and P4 are provided with the EVSE 20a, 20b, 20c, and 20d, respectively. On the other hand, each of the parking slots P5, P6, P7, and P8 is not provided with the EVSE. Further, the vehicle detection sensor 230 is provided in each of the parking slots P1 to P8. The vehicle detection sensor 230 may be a type of sensor that is buried in the ground (for example, a loop coil) or a non-buried sensor (for example, an area sensor). The detection result by the vehicle detection sensor 230 of each of the parking slots P1 to P8 is output to the server 111 (FIG. 2). Based on these detection results, the server 111 can grasp the presence or absence of a parked vehicle in each of the parking slots P1 to P8. For example, in the state shown in FIG. 1, vehicles 30a, 30b, 30c, 30d, and 30e are parked in the parking slots P2, P4, P5, P7, and P8, respectively, and the parking slots P1, P3, and P6 are empty. The state (parked/empty) of each parking slot in the parking lot 200 may be detected by the surveillance camera (camera 210) or a three-dimensional light detection and ranging (3D-LiDAR) parking management system, instead of the vehicle detection sensor.

Each of the EVSE 20a to 20d installed in the parking lot 200 is, for example, a charger with a power supply function, and is configured to be able to charge the power storage device mounted on the vehicle. A vehicle electrically connected to any of the EVSE to 20d can execute the energy management.

Figure 3:
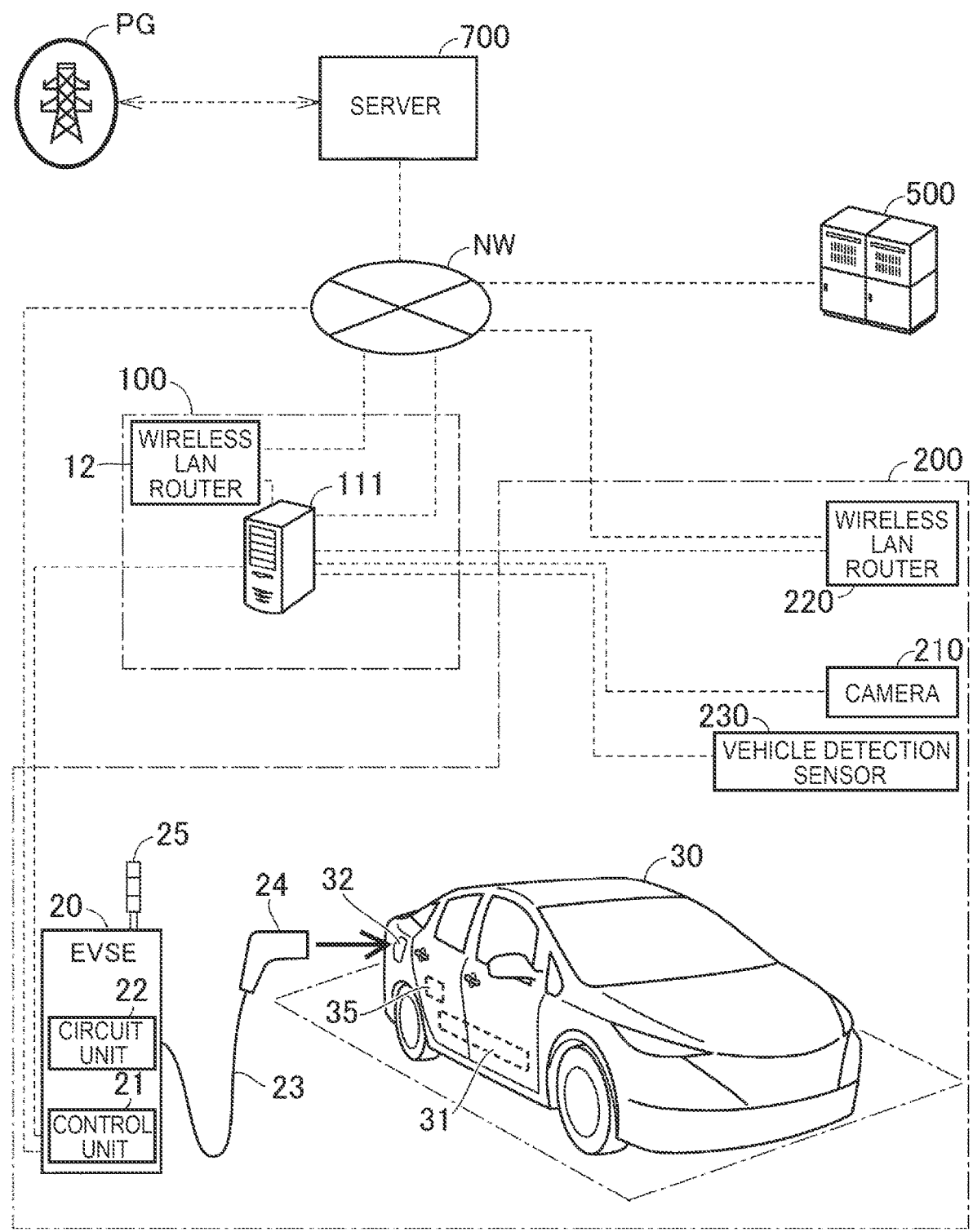
FIG. 3 is a diagram illustrating energy management using electric vehicle service equipment (EVSE) in a store shown in FIG. 1.

FIG. 3 is a diagram illustrating the energy management using the EVSE 20a to 20d in the store 100. In the present embodiment, the EVSE 20a to 20d shown in FIG. 1 have the same configuration, so hereinafter the EVSE 20a to 20d are referred to as the "EVSE 20" when they are not distinguished from each other. Further, a vehicle 30 shown in FIG. 3 corresponds to an example of a vehicle configured to be able to use the EVSE 20. Each of the vehicles 30a to 30e shown in FIG. 1 may have a configuration corresponding to the vehicle 30 described below. A user of the vehicle 30 owns the mobile terminal 50 described above.

Referring to FIG. 3 together with FIGS. 1 and 2, a server 700 corresponds to a computer belonging to a transmission system operator (TSO) of the power system PG. A server 500 corresponds to a computer belonging to an aggregator. The server 111 (the store 100), the server 500, and the server 700 are configured to be able to communicate with each other via a communication network NW. The communication network NW is, for example, a wide area network constructed by the Internet and wireless base stations. Further, the wireless LAN provided by the routers 12 and 220 is connected to the communication network NW. The mobile terminal 50 (FIG. 1) can be connected to the communication network NW via the wireless LAN provided by the router 12 or 220.

As each of the servers 111, 500, and 700, a computer having a processor, a random-access memory (RAM), and a storage device can be adopted. The storage device is an example of a storage medium. As the processor for example, a central processing unit (CPU) can be adopted. The storage device is configured to be able to save stored information. The storage device may include a rewritable non-volatile memory. In each computer, various processes are executed by the processor executing a program stored in the storage device. However, execution of the various processes is not limited to execution by software, and the processes can be executed by dedicated hardware (electronic circuit).

The server 500 is configured to bundle a plurality of distributed energy resources (hereinafter also referred to as "distributed energy resources (DER)") by advanced energy management technology using Internet of Things (IoT), and realize the virtual power plant (VPP). The VPP is a mechanism that causes the remotely and integratedly controlled DER to function as if it were a single power plant. For example, when the energy management of the power system PG is requested from the server 700, the server 500 requests a server managing a DER electrically connected to the power system PG to allow the DER to participate in the VPP. For example, the vehicle 30 electrically connected to the EVSE 20 can function as the DER for the VPP. Therefore, in response to the request from the server 700, the server 500 requests the server 111 to allow the vehicle 30 electrically connected to the EVSE 20 to participate in the VPP.

The vehicle 30 further includes a battery 31 and an electronic control unit (hereinafter referred to as an "ECU") 35. The ECU 35 is a computer provided with a processor and a storage device, for example. The vehicle 30 is an electrified vehicle (xEV) configured to be able to travel using power stored in the battery 31. The vehicle 30 may be a battery electric vehicle (BEV) that does not include an internal combustion engine or a plug-in hybrid electric vehicle (PHEV) that includes an internal combustion engine. As the battery 31, a known vehicle power storage device (for example, a liquid secondary battery, an all-solid-state secondary battery, or an assembled battery) can be adopted. Examples of a vehicle secondary battery include a lithium ion battery and a nickel-metal hydride battery.

The body of the EVSE 20 incorporates a control unit 21 and a circuit unit 22. Further, the EVSE 20 further includes a charging cable 23 and a warning light 25. The control unit 21 includes a processor and a storage device, and is configured to control the circuit unit 22 according to a command from the server 111 or 500. The circuit unit 22 includes a circuit for supplying power to the vehicle 30 (for example, charging the battery 31) and a circuit for supplying power to the power system PG (reverse power flow). The charging cable 23 includes a connector 24 (plug) at the tip thereof.

The vehicle 30 includes an inlet 32 to which the connector 24 is attachable and from which the connector 24 is detachable. The inlet 32 corresponds to a charge-discharge port that functions as both a charge port and a discharge port. The connector 24 of the charging cable 23 connected to the body of the EVSE 20 is connected to the inlet 32 of the parked vehicle 30, so that the vehicle 30 is in a state in which the vehicle 30 is electrically connected to the EVSE 20 (hereinafter also referred to as a "plug-in state"). On the other hand, for example, while the vehicle 30 is traveling, the vehicle 30 is in a state in which the vehicle 30 is not electrically connected to the EVSE 20 (hereinafter also referred to as a "plug-out state"). The EVSE 20 includes a connection detection circuit (not shown) that detects the state of the connector 24 (plug-in state/plug-out state). The connection detection circuit outputs the state of connector 24 to the control unit 21. Further, the control unit 21 acquires, from a sensor included in the circuit unit 22 (not shown), information indicating the operation status of the EVSE 20 (for example, input power from the power system PG, output power to the vehicle 30, input power from the vehicle 30, and output power to the power system PG). In the present embodiment, the use of the EVSE 20 is permitted only for a user who has authenticated to the EVSE 20 through the mobile terminal 50 (convenience store application). The identification information (terminal ID) of the mobile terminal 50 is input to the EVSE 20 by this authentication. The EVSE 20 (control unit 21) then transmits the terminal ID to the server 111 together with the identification information of the EVSE 20. The server 111 can specify the user using the EVSE 20 based on the terminal ID received from the EVSE 20. The information about the EVSE 20 is sequentially transmitted from the EVSE 20 to the server 111 while the EVSE 20 is being used.

Power is supplied from the power system PG to the EVSE 20 via the PCS 121 and the distribution board 122 shown in FIG. 2. When the battery 31 is charged in the plug-in state, the circuit unit 22 of the EVSE 20 converts the power to be supplied into power suitable for supplying power to the vehicle 30, and the converted power is output to the connector 24 of the charging cable 23. In this case, the battery 31 is charged with the power input from the connector 24 to the inlet 32. When the battery 31 is discharged in the plug-in state, the circuit unit 22 of the EVSE 20 converts the power from the vehicle 30 (the power discharged from the battery 31) into power corresponding to the power system PG, and the converted power is output to the power system PG via the distribution board 122 and the PCS 121 shown in FIG. 2. Thus, the EVSE 20 is configured to allow reverse power flow to the power system PG.

In the plug-in state, the control unit 21 of the EVSE 20 and the ECU 35 of the vehicle 30 perform wired communication via a communication line in the charging cable 23. In the EVSE 20, the circuit unit 22 charges or discharges the battery 31 as described above according to a command from the control unit 21. While the battery 31 is being charged or discharged, the control unit 21 receives the state of the battery 31 (for example, the temperature, the current, the voltage, and the SOC) from the ECU 35, and controls the circuit unit 22 such that the charging power or the discharging power is close to a target value. The SOC indicates the remaining amount of power, and represents, for example, the ratio of the current power storage amount to the power storage amount in a fully charged state from 0% to 100%.

The warning light 25 is controlled by the server 111. The warning light 25 is configured to be switchable between presence and absence of warning. The warning light 25 issues a warning when instructed to issue a warning by the server 111, and stops the warning when instructed to stop the warning by the server 111. The warning light 25 may be extinguished in normal times, and may blink or be lit during a warning. Further, the warning light 25 may be lit in a first color (for example, green) in normal times, and may be lit in a second color (for example, red) during a warning. The warning light 25 may have a speaker function, and may cause a sound to occur during a warning.

When the server 111 receives a VPP participation request from the server 500, the server 111 requests the vehicle 30 in the plug-in state to execute the energy management. For example, the server 111 sends a signal requesting the energy management to the mobile terminal 50 corresponding to the vehicle 30 (that is, the mobile terminal 50 carried by the user of the vehicle 30), and requests the mobile terminal 50 to reply with either acceptance or rejection. When the server 111 receives the reply with acceptance from the mobile terminal 50, the server 111 sends information regarding the EVSE 20 electrically connected to the vehicle 30 (for example, a position, communication address, and specifications) to the server 500, and permits the server 500 to remotely control the EVSE 20. The server 500 performs charge-discharge control of the battery 31 while communicating with the control unit 21 of the EVSE 20. The server 500 can cause the vehicle 30 to execute the energy management for VPP through such charge-discharge control. Although the details will be described below, in the present embodiment, when the server 500 is performing the charge-discharge control of the battery 31, the server 111 executes a process of prompting the vehicle 30 to stay in the parking lot 200 (hereinafter also referred to as a "stay prompting process") on the vehicle 30.

By the way, when the vehicle is parked in the parking lot 200 for a long time, a parking space in the parking lot 200 tends to be insufficient. On the other hand, there is a possibility that utilizing the vehicle parked in the parking lot 200 for management of the store will be advantageous for both the store owner and the user of the vehicle. Therefore, in the parking lot management method according to the present embodiment, the server 111 determines whether the parking space in the parking lot 200 is insufficient. Then, when it is determined that the parking space in the parking lot 200 is insufficient, the server 111 executes the process of prompting at least one vehicle parked in the parking lot 200 to exit. On the other hand, when it is determined that the parking space in the parking lot 200 is not insufficient, the server 111 requests at least one vehicle electrically connected to any one of the EVSE 20a to 20d to execute the energy management.

FIG. 4 is a flowchart showing the parking lot management method according to the present embodiment. A series of processes shown in this flowchart is repeatedly executed by the server 111. "S" in the flowchart means a step.

Referring to FIG. 4 together with FIGS. 1 to 3, the server 111 acquires the current availability of the parking lot 200 in S11. Specifically, the server 111 acquires information indicating the presence or absence of a parked vehicle for each of the parking slots P1 to P8 from the vehicle detection sensor 230 provided in each of the parking slots P1 to P8.

In S12, the server 111 predicts the future number of customers (the number of users), and using the current availability of the parking lot 200 and the predicted number of customers, the server 111 determines whether the parking space in the parking lot 200 is insufficient. The server 111 may predict the number of customers during a period from the current time to the elapse of a predetermined time (for example, 30 minutes). The server 111 may predict the number of customers, for example, based on historical data indicating the number of customers for each time zone. The server 111 may predict the number of customers using a trained model obtained by machine learning using artificial intelligence (AI). Specifically, the server 111 may predict the future number of customers using a trained model that has learned to output the future number of customers when the current time is input.

In the present embodiment, the server 111 determines YES in S12 when the parking lot 200 is full (a state in which all of the parking slots P1 to P8 are "full"). Further, even in a state in which the parking lot 200 is not full (a state in which any one of the parking slots P1 to P8 is "empty"), the server 111 determines YES in S12 when it is predicted that the parking lot 200 will be full based on the predicted future number of customers. On the other hand, in a state in which the parking lot 200 is not full, the server 111 determines NO in S12 when it is predicted that the parking lot 200 will not be full based on the predicted future number of customers. When the parking lot 200 is in a completely empty state (a state in which all of the parking slots P1 to P8 are "empty"), the server 111 determines NO in S12, and the series of processes shown in FIG. 4 ends when the server 111 also determines NO in S21 to be described below.

When the server 111 determines that the parking space in the parking lot 200 is insufficient (YES in S12), in S13, the server 111 determines whether a vehicle that satisfies a predetermined requirement (hereinafter referred to as a "target vehicle") is present among the vehicles parked in the parking lot 200. The predetermined requirement can be set as appropriate, but in the present embodiment, a vehicle that has been charged using any one of the EVSE 20a to 20d and for which a predetermined time has elapsed since the start of charging is treated as the target vehicle. That is, the predetermined requirement includes that the vehicle has been charged using any one of the EVSE 20a to 20d, and that the predetermined time (for example, 30 minutes) has elapsed since the start of charging the vehicle.

When the target vehicle is present among the vehicles parked in parking lot 200 (YES in S13), the process proceeds to S14. When a plurality of the target vehicles is present, the server 111 executes processes of S14 to S18 described below for each target vehicle.

In S14, the server 111 executes a first exit prompting process. The first exit prompting process is a process of prompting the target vehicle to exit from the parking lot 200. In the present embodiment, the first exit prompting process includes a notification process and a wireless LAN use prohibition process for the mobile terminal 50 corresponding to the target vehicle (that is, the mobile terminal 50 carried by the user of the target vehicle), and a warning process by the warning light 25 corresponding to the target vehicle (that is, the warning light 25 of the EVSE 20 connected to the target vehicle). Specifically, the server 111 sends, to the mobile terminal 50, a notification prompting the target vehicle to exit. Upon receiving the notification from the server 111, the mobile terminal 50 displays a screen Sc1, for example. The screen Sc1 includes a message prompting the user of the target vehicle to exit. In addition, the server 111 controls the routers 12, 220 so as to prohibit the use of the wireless LAN (more specifically, the communication network provided by the store 100 within the premises of the store 100 through the routers 12, 220) by the mobile terminal 50. As a result, convenience for the user of the target vehicle within the premises of the store 100 (including the parking lot 200) is reduced. In addition, the server 111 controls the warning light 25 such that the warning light 25 issues a warning prompting the target vehicle to exit.

In subsequent S15, the server 111 determines whether the target vehicle has exited according to the first exit prompting process. For example, the server 111 may determine whether the target vehicle has exited based on a signal from the vehicle detection sensor 230 corresponding to the target vehicle.

When the target vehicle has not exited (NO in S15), the server 111 determines in S16 whether a predetermined time margin has elapsed. The predetermined time margin is, for example, a period from the start of the first exit prompting process to the elapse of a predetermined time (for example, 10 minutes).

While the target vehicle has not exited, and the time margin has not elapsed (NO in both S15 and S16), the processes of S14 to S16 are repeated. As a result, the first exit prompting process is continuously executed. Then, when the time margin has elapsed while the target vehicle does not exit (YES in S16), the process proceeds to S17.

In S17, the server 111 executes a second exit prompting process. The second exit prompting process is a process of prompting the target vehicle to exit from the parking lot 200 by a process different from the first exit prompting process. The second exit prompting process may be a process of prompting the target vehicle to exit more forcibly than the first exit prompting process. In the present embodiment, the second exit prompting process further includes a forced discharge process in addition to all the processes included in the first exit prompting process. Specifically, the server 111 controls the EVSE 20 corresponding to the target vehicle such that discharging is performed from the power storage device (battery 31) mounted on the target vehicle to the distribution board 122. The discharged power may be stored in the power storage device 124. In addition to or instead of the forced discharge process, the second exit prompting process may include a process of forfeiting the points earned by the user of the target vehicle on the convenience store application.

In subsequent S18, the server 111 determines whether the target vehicle has exited according to the second exit prompting process. For example, the server 111 may determine whether the target vehicle has exited based on a signal from the vehicle detection sensor 230 corresponding to the target vehicle. While the target vehicle has not exited (NO in S18), the processes of S17 and S18 are repeated. As a result, the second exit prompting process is continuously executed. When the target vehicle exits according to the second exit prompting process (YES in S18), the series of processes shown in FIG. 4 ends, and the process returns to the first step (S11).

When the server 111 determines that the parking space in parking lot 200 is not insufficient (NO in S12), the process proceeds to S21 without executing the processes of S13 to S18 described above. In S21, the server 111 determines whether a predetermined VPP condition is satisfied.

In the present embodiment, the VPP condition is satisfied when both of the following requirements are satisfied: the server 111 receives the VPP participation request from the server 500 (first VPP requirement); and a vehicle capable of meeting the request from the server 500 is present in the parking lot 200 (second VPP requirement), and the VPP condition is not satisfied when any of the above requirements is not satisfied.

For example, when a vehicle parked in the plug-in state is not present in any of the parking slots P1 to P4, the server 111 determines that the second VPP requirement is not satisfied. On the other hand, when a vehicle in the plug-in state is present, the server 111 determines whether the vehicle can meet the request from the server 500 based on the SOC of the power storage device mounted on the vehicle. For example, when the server 500 requests charging of surplus power, a vehicle with a sufficiently low SOC can meet the request, but a vehicle with a high SOC (for example, a fully charged state) cannot meet the request. Further, when the server 500 requests power supply (discharging), a vehicle with a sufficiently high SOC can meet the request, but a vehicle with a low SOC (for example, a completely discharged state) cannot meet the request.

When the VPP condition is not satisfied (NO in S21), the series of processes shown in FIG. 4 ends, and the process returns to the first step (S11). On the other hand, when the VPP condition is satisfied (YES in S21), the process proceeds to S22. Hereinafter, the vehicle determined to be able to meet the request from the server 500 in S21 is referred to as a "VPP vehicle". When a plurality of the target vehicles is present, the server 111 executes processes of S22 to S26 described below for each VPP vehicle.

In S22, the server 111 requests the VPP vehicle to execute the energy management. Specifically, the server 111 sends a request signal to the mobile terminal 50 corresponding to the VPP vehicle, and requests the mobile terminal 50 to reply with either acceptance or rejection. Upon receiving the request signal, the mobile terminal 50 displays a message requesting the energy management and a period of the energy management (hereinafter also referred to as a "VPP period"), and further requests the user to input either acceptance or rejection.

In subsequent S23, the server 111 determines whether the energy management is continued. When the server 111 receives the reply with rejection from the user of the VPP vehicle to which the energy management has been requested, or when there is no reply within a predetermined time after the request, it is determined that the the energy management by the VPP vehicle is not started (NO in S23), and the process proceeds to S26. In this case, in S26, the server 111 sends a message to the mobile terminal 50 corresponding to the VPP vehicle to inform that the VPP vehicle will not participate in the VPP. This message is displayed on the mobile terminal 50.

When the server 111 receives the reply with acceptance from the user of the VPP vehicle to which the energy management has been requested, it is determined YES in S23, and the process proceeds to S24. As a result, the energy management by the VPP vehicle is started. During execution of the energy management, the processes of S23 to S25 are repeatedly executed, and in S23, it is determined whether the energy management is continued.

In S24, the server 111 executes the stay prompting process. The stay prompting process is a process of prompting the VPP vehicle to stay in the parking lot 200. In the present embodiment, the stay prompting process includes a notification process for the mobile terminal 50 corresponding to the VPP vehicle (that is, the mobile terminal 50 carried by the user of the VPP vehicle). Specifically, the server 111 sends, to the mobile terminal 50, a notification prompting the VPP vehicle to stay in the parking lot 200. Upon receiving the notification from the server 111, the mobile terminal 50 displays a screen Sc2, for example. The screen Sc2 includes a message prompting the user of the VPP vehicle to stay in parking lot 200. Further, during execution of the energy management by the VPP vehicle, the server 111 permits the user of the VPP vehicle to use the parking lot 200 and the wireless LAN (more specifically, the wireless LAN provided by the routers 12 and 220). The server 111 may limit the use of the wireless LAN by other users such that the user of the VPP vehicle can preferentially use the wireless LAN.

The content of the stay prompting process executed in S24 may change according to the elapsed time from the start of the energy management. For example, at a predetermined timing within the VPP period, the server 111 may execute a process of issuing a coupon to the user of the VPP vehicle through the convenience store application as the stay prompting process. Further, the server 111 may give points according to the elapsed time from the start of the energy management to the user of the VPP vehicle on the convenience store application, in addition to the incentive according to the energy management performance described below.

In S25, the server 111 sends information about the EVSE 20 electrically connected to the VPP vehicle (for example, information necessary for the charge-discharge control) to the server 500, and permits the server 500 to remotely control the EVSE 20. The server 500 executes the charge-discharge control of the battery 31 via the EVSE 20. The server 500 causes the VPP vehicle to execute the energy management (for example, the energy management of the power system PG) for the VPP through such charge-discharge control.

In S23 after the energy management is started, the server 111 determines whether a predetermined VPP continuation condition is satisfied.

In the present embodiment, the VPP continuation condition is satisfied when all of the following end requirements are not satisfied: the VPP vehicle is in the plug-out state (first end requirement); the SOC of the power storage device of the VPP vehicle used for the energy management is equal to or higher than a predetermined upper limit value (second end requirement); the SOC of the power storage device of the VPP vehicle used for the energy management is equal to or lower than a predetermined lower limit value (third end requirement); the mobile terminal 50 corresponding to the VPP vehicle transmits an end request to the server 111 (fourth end requirement); and the energy management is completed (fifth end requirement), and the VPP continuation condition is not satisfied when any of the above end requirements is satisfied. The upper limit value of the SOC (second end requirement) can be set as appropriate, but may be an SOC value selected from the range of 90% to 100%, for example. The lower limit value of the SOC (third end requirement) can be set as appropriate, but may be an SOC value selected from the range of 0% to 50%, for example. During execution of the energy management, the server 111 may sequentially transmit the SOC of the VPP vehicle to the mobile terminal 50 corresponding to the VPP vehicle. The user may check the current SOC displayed by the mobile terminal 50, and determine whether the energy management is continued. When the user transmits the end request to the server 111 through the mobile terminal 50 (convenience store application), the fourth end requirement is satisfied. Thus, the user of the VPP vehicle can stop the energy management at any timing. The fifth end requirement is satisfied, for example, by the arrival of the end time of the VPP period.

On the other hand, when any of the end requirements described above is satisfied (NO in S23), the energy management ends. In this case, in S26, the server 111 sends a message indicating the end of the energy management together with the reason to the mobile terminal 50 corresponding to the VPP vehicle. This message is displayed on the mobile terminal 50. When the process of S26 is executed, the series of processes shown in FIG. 4 ends, and the process returns to the first step (S11). The remote control of the EVSE 20a to 20d by the server 500 is prohibited while the energy management is not being executed.

When the energy management for the VPP ends, the server 111 provides the user of the VPP vehicle with an incentive (for example, points) according to the performance of the energy management through the convenience store application. For example, a part of the incentive paid by the aggregator to the store owner of the store 100 as consideration for participating in the VPP is returned to the user of the VPP vehicle. The message sent in S26 may include incentive information obtained by the user (for example, the number of given points). The points may be treated as virtual currency, or may be redeemed for cash. Further, the points may be converted into goods or rights (for example, rights to receive services commensurate with the number of points).

As described above, the parking lot management method according to the present embodiment includes the series of processes shown in FIG. 4. In S12, the server 111 determines whether the parking space in the parking lot 200 is insufficient. Then, when it is determined that the parking space in parking lot 200 is insufficient (YES in S12), the server 111 executes exit prompting control (S13 to S18). This exit prompting control includes executing the process of prompting at least one vehicle parked in the parking lot 200 to exit (S14, S17). On the other hand, when it is determined that the parking space in parking lot 200 is not insufficient (NO in S12), the server 111 executes stay prompting control (S21 to S26). This stay prompting control includes requesting at least one vehicle electrically connected to the EVSE 20 in the parking lot 200 to execute the energy management (S22).

According to the above method, when it is determined that the parking space in the parking lot 200 is insufficient, the process of prompting the parked vehicle to exit is executed. As a result, the shortage of the parking space in the parking lot 200 of the store 100 is suppressed. On the other hand, when the parking space in the parking lot 200 is not insufficient, the process of prompting the parked vehicle to exit is not executed. Then, when a predetermined condition (S21) is satisfied, the energy management is requested to the parked vehicle. As a result, the utilization of the parked vehicle is promoted.

Further, the exit prompting control further includes confirming whether a target vehicle is present (S13, if NO the series of processes shown in FIG. 4 ends), whether the vehicle that has received the exit prompting process (S14) has exited (S15 during the first exit prompting process, or S18 during the second exit prompting process, if YES the series of processes shown in FIG. 4 ends), and changing the content of the exit prompting process for the vehicle when the vehicle that has received the exit prompting process does not exit (S17). According to such control, when the vehicle that has received the exit prompting process (first exit prompting process) does not exit, the content of the exit prompting process for the vehicle is changed, so that it is possible to prompt the vehicle to exit with the more effective process (second exit prompting process).

Each of the first and second exit promoting processes is not limited to the above-described process contents, and can be changed as appropriate. For example, in S14 of FIG. 4, only the wireless LAN use prohibition process may be executed as the first exit prompting process, and in S17 of FIG. 4, only the warning process may be executed as the second exit prompting process.

The requirement for the target vehicle is not limited to the requirement described above, and can be changed as appropriate. The target vehicles are not limited to the vehicles parked in the parking slots P1 to P4. All vehicles parked in the parking lot 200 may be the target vehicles regardless of the parking slots. The exit prompting process may be determined according to the target vehicles.

The power system PG (external power source) is not limited to a large-scale AC grid, and may be a micro grid or a direct current (DC) grid. Further, the configuration of the energy management system is not limited to the configuration shown in FIG. 3. For example, the functions of the server 500 may be implemented in the server 111, and the server 500 may be omitted.

In the above embodiment, when it is determined that the parking space in the parking lot 200 is not insufficient, the server 111 requests the parked vehicle to execute the energy management. However, the utilization method of the parked vehicle is not limited to the energy management. When it is determined that the parking space in the parking lot 200 is not insufficient, the server 111 may request the parked vehicle to provide services other than the energy management. Specifically, the server 111 may request the vehicle to provide services using equipment of the parked vehicle (for example, provision of the vehicle for power supply, calculation, communication, or a trunk room).

In the above embodiment, the server 111 has a program that causes a computer to execute the parking lot management method shown in FIG. 4. The server 111 includes a storage device that stores such a program and a processor that executes the program. However, the process shown in FIG. 4 can be changed as appropriate. For example, the parking lot management method shown in FIG. 4 includes both executing the process of prompting at least one vehicle parked in the parking lot to exit when it is determined that the parking space in the parking lot is insufficient (S13 to S18), and requesting at least one vehicle electrically connected to the power supply facility to execute the energy management when it is determined that the parking space in the parking lot is not insufficient and a predetermined condition is satisfied (S21 to S26), but may be modified to include only one of them.

In the above embodiment, the parking lot management method is executed by an on-premises server (the server 111 shown in FIG. 2). However, the present disclosure is not limited to this, and the functions of the server 111 (especially functions related to parking lot management) may be implemented on the cloud by cloud computing.

The various modifications described above may be implemented in any combination.

The embodiment disclosed herein should be considered to be exemplary and not restrictive in all respects. The scope of the present disclosure is shown by the scope of claims rather than the description of the above embodiment, and is intended to include all modifications within the meaning and the scope equivalent to the scope of claims.

What is claimed is:

1. A parking lot management method for managing a parking lot, the parking lot management method comprising:
   determining whether a parking space in the parking lot is insufficient;
   in the parking lot, a power supply facility configured to be able to charge a power storage device mounted on a vehicle is installed;
   requesting the vehicle electrically connected to the power supply facility in the parking lot to execute energy management when a determination is made that the parking space in the parking lot is not insufficient;

executing a process of prompting the vehicle that has accepted a request of the energy management to stay in the parking lot;

executing charge-discharge control of the power storage device mounted on the vehicle that has accepted the request of the energy management;

executing a process of prompting the vehicle parked in the parking lot to exit when the determination is made that the parking space in the parking lot is insufficient;

determining whether a first time period has elapsed since a start of charging the power storage device mounted on the vehicle;

in response to determining that the first time period has elapsed, executing a first exit prompting process;

determining whether a second time period has elapsed since the first exit prompting process has executed, the second time period being shorter than the first time period; and in response to determining that the second time period has elapsed, executing a second exit prompting process, wherein the second exit prompting process includes discharging the power storage device mounted on the vehicle to a distribution board.

2. The parking lot management method according to claim 1, wherein the process of prompting the vehicle that has accepted the request of the energy management to stay in the parking lot includes permitting a user of the vehicle to use a communication network provided by the power supply facility to the parking lot.

3. The parking lot management method according to claim 1, wherein the power supply facility includes a warning light, and the first exit prompting process is a warning by the warning light.

4. The parking lot management method according to claim 1, wherein determining whether the parking space is insufficient includes:

predicting a future number of users; and determining whether the parking space in the parking lot is insufficient using current availability of the parking lot and the predicted future number of users.

5. The parking lot management method according to claim 1, wherein executing the process of prompting the vehicle to exit includes issuing a warning by a warning light installed in the parking lot.

6. The parking lot management method according to claim 1, wherein executing the process of prompting the vehicle to exit includes prohibiting use of a communication network provided by a facility to the parking lot.

7. The parking lot management method according to claim 1, further comprising:

confirming whether the vehicle that has received the process of prompting the vehicle to exit has exited; and changing a content of the process of prompting the vehicle to exit when the vehicle that has received the process of prompting the vehicle to exit does not exit.

8. A non-transitory computer-readable storage medium storing a program that, when executed, causes a computer to execute the parking lot management method according to claim 1.

9. A computer device comprising a storage device for storing the program according to claim 8 and a processor for executing the program.

10. The parking lot management method according to claim 1, wherein the first time period is 30 minutes and the second time period is 10 minutes.

* * * * *